United States Patent
Bulatowicz

(10) Patent No.: US 9,961,453 B2
(45) Date of Patent: May 1, 2018

(54) OPTICAL MICROPHONE SYSTEM

(71) Applicant: Michael D. Bulatowicz, Sun Prairie, WI (US)

(72) Inventor: Michael D. Bulatowicz, Sun Prairie, WI (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 61 days.

(21) Appl. No.: 15/081,043

(22) Filed: Mar. 25, 2016

(65) Prior Publication Data

US 2017/0280252 A1    Sep. 28, 2017

(51) Int. Cl.
H04R 3/00    (2006.01)
H04R 23/00   (2006.01)

(52) U.S. Cl.
CPC ......... *H04R 23/008* (2013.01); *H04R 23/006* (2013.01); *H04R 2410/00* (2013.01)

(58) Field of Classification Search
CPC ........................... H04R 23/008; H04R 25/606
See application file for complete search history.

(56) References Cited

U.S. PATENT DOCUMENTS

| | | |
|---|---|---|
| 7,355,720 B1 | 4/2008 | Carr |
| 7,711,130 B2 | 5/2010 | Husung |
| 7,826,629 B2 | 11/2010 | Miles et al. |
| 7,880,894 B2 | 2/2011 | Hirata et al. |
| 8,072,609 B1 | 12/2011 | Trivedi et al. |
| 8,542,956 B2 | 9/2013 | Akkaya et al. |
| 8,813,571 B2 | 8/2014 | Iwamoto et al. |
| 2007/0236704 A1 | 10/2007 | Carr |
| 2009/0154308 A1 | 6/2009 | Kato |
| 2011/0303008 A1 | 12/2011 | Zhang et al. |
| 2012/0143018 A1 | 6/2012 | Skidmore et al. |
| 2013/0230329 A1 | 9/2013 | Sangawa et al. |
| 2013/0327146 A1 | 12/2013 | Meyer et al. |
| 2014/0054451 A1 | 2/2014 | Abedin et al. |
| 2014/0070082 A1 | 3/2014 | Guo et al. |

FOREIGN PATENT DOCUMENTS

| | | |
|---|---|---|
| EP | 0 553 877 A1 | 8/1993 |
| WO | WO 2010/094190 A1 | 8/2010 |

OTHER PUBLICATIONS

Extended European Search Report for corresponding EP 17 16 0682, dated Jul. 5, 2017.

*Primary Examiner* — Regina N Holder
(74) *Attorney, Agent, or Firm* — Tarolli, Sundheim, Covell & Tummino LLP

(57) ABSTRACT

One embodiment includes an optical microphone system. The system includes a laser configured to emit an optical beam at a linear polarization and an optical cavity system comprising a membranous mirror that is configured to reflect the optical beam and to vibrate in response to an acoustic input signal. The optical cavity system includes at least one photodetector configured to receive at least a portion of the optical beam to generate a microphone signal that is indicative of the vibration of the membranous mirror resulting from the acoustic input signal based on the reflection of the optical beam. The system further includes an acoustic processor configured to process the microphone signal to calculate a frequency of the acoustic input signal.

19 Claims, 5 Drawing Sheets

OPTICAL MICROPHONE SYSTEM

TECHNICAL FIELD

The present invention relates generally to sensor systems, and specifically to an optical microphone system.

BACKGROUND

A variety of different microphones have been implemented to generate microphone signals corresponding to an acoustic pressure oscillation that is associated with an acoustic input signal. Microphones can be implemented in any of a variety of applications in which acoustic input signals are to be converted to digital signals, such as can be amplified, transmitted as data, and/or converted to visual data (e.g., text, etc.). Examples of microphone types include piezoelectric, electromagnetic, and interferometric microphones that typically utilize amplitude-modulation (AM) signals for detection of the acoustic input signals. However, AM signals can be sensitive to both amplitude noise and phase noise. Associated electronics can be implemented to mitigate amplitude and/or phase noise, but such noise sources, particularly amplitude noise, can be difficult to manage.

SUMMARY

One embodiment includes an optical microphone system. The system includes a laser configured to emit an optical beam at a linear polarization and an optical cavity system comprising a membranous mirror that is configured to reflect the optical beam and to vibrate in response to an acoustic input signal. The optical cavity system includes at least one photodetector configured to receive at least a portion of the optical beam to generate a microphone signal that is indicative of the vibration of the membranous mirror resulting from the acoustic input signal based on the reflection of the optical beam. The system further includes an acoustic processor configured to process the microphone signal to calculate a frequency of the acoustic input signal.

Another embodiment includes a method for measuring acoustic input signals. The method includes generating an optical beam at a linear polarization via a laser, and providing the optical beam in an optical cavity system comprising the laser and a membranous mirror that is configured to reflect the optical beam. The method also includes generating a microphone signal via at least one photodetector configured to receive at least a portion of the optical beam. The microphone signal can be indicative of motion of the membranous mirror resulting from the acoustic input signal based on the reflection of the optical beam. The method further includes demodulating the microphone signal via a reference frequency signal to determine characteristics of the acoustic input signal.

Another embodiment includes an optical microphone system. The system includes an optical acoustic detection system. The optical acoustic detection system includes a local oscillator configured to generate a reference frequency signal and a laser configured to emit an optical beam at a linear polarization that periodically transitions between a first linear polarization and a second linear polarization in response to a reflected portion of the optical beam and an optical cavity system. The optical cavity system includes a quarter-wave plate arranged between the laser and the membranous mirror and configured to convert the optical beam from one of the first and second linear polarizations to a circular-polarization and to convert the reflected optical beam from the circular-polarization to the other of the first and second linear polarizations. The optical cavity system also includes a membranous mirror that is configured to reflect the optical beam to provide the reflected optical beam and at least one photodetector configured to receive at least a portion of the optical beam to generate a microphone signal that is indicative of motion of the membranous mirror resulting from an acoustic input signal based on the reflection of the optical beam. The system further includes an acoustic processor configured to determine at least one of a frequency and an amplitude of the acoustic input signal based on the microphone signal relative to the reference frequency signal.

DETAILED DESCRIPTION

The present invention relates generally to sensor systems, and specifically to an optical microphone system. The optical microphone system includes a local oscillator configured to generate a reference frequency signal, and includes a laser, which could be configured as a vertical-cavity surface-emitting laser (VCSEL), that is configured to generate an optical beam at a first linear polarization (i.e., parallel or perpendicular). The optical microphone system also includes an optical cavity system that includes a membranous mirror and at least one photodetector. The membranous mirror can be configured to reflect the optical beam back toward the laser, and can be arranged to vibrate in response to an acoustic input signal. The photodetector(s) can substantially surround and can be arranged substantially planar with a gain medium associated with the laser, such that the reflected optical beam is received at both the gain medium of the laser and at the photodetector(s). The reflected optical beam can be received at a second linear polarization opposite the first linear polarization (i.e., perpendicular or parallel, respectively). For example, the optical cavity system can include a quarter-wave plate arranged between the laser and the membranous mirror, such that the quarter-wave plate can convert the optical beam from the first linear polarization to a circular-polarization and convert the reflected optical beam from the circular-polarization to the second linear polarization, and vice-versa.

The reflected optical beam can thus stimulate the gain medium of the laser to periodically oscillate between emitting the optical beam at the first linear polarization and the second linear polarization. Therefore, the photodetector(s) can be configured to detect the periodic oscillation based on transitions between the first and second linear polarizations of the optical beam. The photodetector(s) can be configured to generate a microphone signal that has a frequency associated with the periodic oscillation and the vibration of the membranous mirror resulting from the acoustic input signal. The system can further include an acoustic processor that is configured to determine characteristics of the acoustic input signal based on the microphone signal. For example, the reference frequency signal can have a frequency that is associated with the periodic transitions of the linear polarization of the optical beam, and can be phase-locked to a frequency that is associated with the periodic transitions (e.g., such as pre-scaled to a lesser frequency amplitude). Therefore, the acoustic processor can demodulate the microphone signal to determine at least one of frequency and amplitude of the acoustic input signal.

Figure 1:
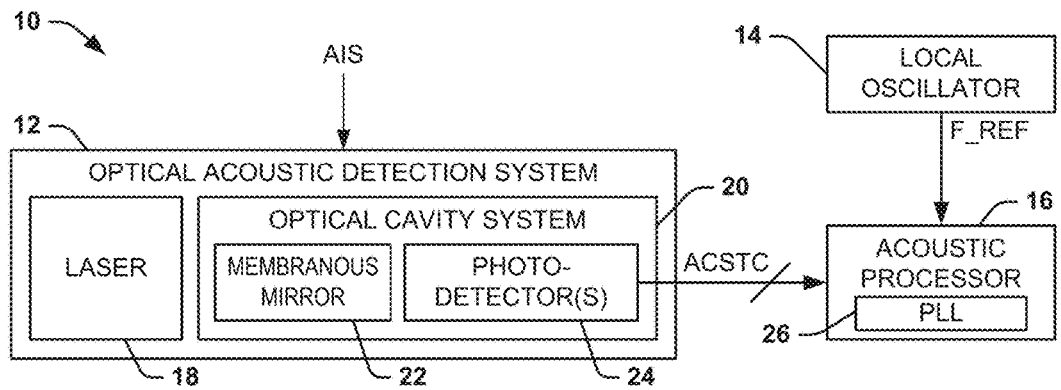
FIG. 1 illustrates an example of an optical microphone system.

FIG. 1 illustrates an example of an optical microphone system 10. The optical microphone system 10 can be implemented in any of a variety of applications, such as for wireless communication devices. Thus, the optical microphone system 10 can be configured to determine characteristics of an acoustic input signal that is provided to the optical microphone system 10, such that the characteristics of the acoustic input signal can be processed in a variety of ways (e.g., amplified, digitized, etc.). In the example of FIG. 1, the acoustic input signal is demonstrated as a signal AIS.

The optical microphone system 10 includes an optical acoustic detection system 12, a local oscillator 14, and an acoustic processor 16. The optical acoustic detection system 12 is configured to detect the acoustic input signal AIS. The optical acoustic detection system 12 includes a laser 18 and an optical cavity system 20. The laser 18 can be configured, for example, as a vertical-cavity surface-emitting laser (VCSEL), such as including a gain medium that includes perpendicular stimulation axes. The laser 18 is configured to generate an optical beam that alternates between linear polarizations, as described in greater detail herein. For example, the laser 18 can alternate between a first linear polarization, which could be a parallel polarization (i.e., p-polarization) relative to a first stimulation axis of the gain medium of the laser 18, and a second linear polarization, which could be a perpendicular polarization (i.e., s-polarization) relative to the first stimulation axis of the gain medium of the laser 18.

In the example of FIG. 1, the optical cavity system 20 includes a membranous mirror 22 and one or more photodetectors 24. The membranous mirror 22 can be mounted to a housing of the optical cavity system 20, such that the membranous mirror 22 is configured to vibrate in response to the acoustic input signal AIS. As an example, the membranous mirror 22 can be arranged at an input of optical microphone system 10, such that the acoustic input signal AIS is substantially unimpeded by any components of the optical microphone system 10. The membranous mirror 22 is also configured to reflect the optical beam emitted from the laser 18 toward the photodetector(s) 24 to be received at the photodetector(s) 24 at the opposite polarization of that which is emitted from the laser 18 (e.g., the parallel or the perpendicular polarization). Alternatively, as described in greater detail herein, the membranous mirror 22 can be partially reflective, such that the photodetector(s) 24 can be configured to receive a transmissive portion of the optical beam. As an example, the membranous mirror 22 can also reflect the optical beam back to the laser 18, such as to stimulate an orthogonal stimulation axis of the gain medium of the laser 18, such as to cause the laser 18 to periodically oscillate between emission of one of the parallel and perpendicular polarization and emission of the other of the parallel and perpendicular polarization. Therefore, the laser 18 and the membranous mirror 22 can be disposed at opposite ends of an optical cavity of the optical cavity system 20, such that the cavity length of the optical cavity of the optical cavity system 20 is modulated by the vibration of the membranous mirror 22.

The photodetector(s) 24 can thus be configured to measure an intensity of the at least a portion of the optical beam (e.g., a reflected portion of the optical beam and/or a portion of the optical beam that is transmissive through a partially reflective membranous mirror 22) and to generate a respective at least one microphone signal ACSTC. As an example, the microphone signal(s) ACSTC can have a frequency that corresponds to the periodic oscillation between the emission of the parallel and perpendicular polarizations from the laser 18. The frequency of the microphone signal(s) ACSTC can thus vary in response to vibration of the membranous mirror 22 in response to the acoustic input signal AIS, such that the microphone signal(s) ACSTC can be frequency-modulated (FM) signal(s) having a carrier frequency corresponding to the periodic oscillation of the linear polarizations of the optical beam and having a baseband frequency corresponding to the acoustic input signal AIS. Therefore, the microphone signal(s) ACSTC can be indicative of the presence of the acoustic input signal AIS. The microphone signal ACSTC is provided to the acoustic processor 16 that is configured to determine characteristics of the acoustic input signal AIS based on the microphone signal ACSTC and a reference frequency signal F_REF generated by the local oscillator 14. For example, the reference frequency signal F_REF can have a frequency corresponding to the periodic transitions between the linear polarizations of the optical beam. Therefore, the acoustic processor 16 can demodulate the microphone signal(s) ACSTC to determine at least one of a frequency and an amplitude of the acoustic input signal AIS based on removing the carrier signal from the microphone signal(s) ACSTC.

Therefore, the optical microphone system 10 is configured to provide the microphone signal(s) ACSTC as FM signal(s) that are modulated by the acoustic input signal AIS. Therefore, the optical microphone system 10 can operate in a more accurate and simplistic manner than typical microphone systems. As an example, typical microphone systems that implement amplitude modulation can be highly sensitive to amplitude noise, thus being more prone to errors and/or requiring additional electronics to substantially mitigate amplitude noise. However, by implementing the microphone signal(s) ACSTC as FM signal(s), the optical microphone system 10 is substantially insensitive to amplitude noise, thus resulting in substantial improvements in the noise limits of the optical microphone system 10 relative to typical microphone systems that implement amplitude modulation. Furthermore, the optical microphone system 10 can be batch fabricated in a simplistic manner, as opposed to other types of acoustic detection sensors, such as fiber-optic acoustic sensors, that are fabricated on an individual basis for more specific acoustic detection purposes.

In addition, in the example of FIG. 1, the acoustic processor 16 includes a phase-lock loop (PLL) 26 that is configured to phase-lock the reference frequency signal F_REF. As an example, the local oscillator 14 can be configured as a voltage-controlled oscillator (VCO), a field-programmable gate array (FPGA), or any of a variety of adjustable reference frequency sources. For example, the PLL 26 can be configured to phase-lock the reference frequency signal F_REF to a frequency that is associated with the periodic transitions between the linear polarizations of the optical beam, such as based on pre-scaling the frequency of the periodic transitions between the linear polarizations of the optical beam to a lower frequency. For example, the frequency to which the PLL 26 can phase-lock the reference frequency signal F_REF can be based on the microphone signal(s) ACSTC, such as during a calibration period or during real-time operation of the optical microphone system 10. The update frequency of the PLL 26 can be a significantly low frequency, such as less than a minimum audible detection frequency of the acoustic input signal AIS, such as less than a minimum frequency of interest (e.g., less than 10 Hz).

Based on the phase-locking of the reference frequency signal F_REF to the frequency associated with the periodic transitions, the optical microphone system 10 can substantially mitigate a large number of potentially deleterious effects. As an example, any external factors that can change a cavity length of the optical cavity system 20, and thus change the frequency of the microphone signal(s) ACSTC, can shift the native frequency of the optical cavity system 20, and thus change a required frequency and phase of the reference signal F_REF. Such external factors that can change the native frequency of the laser 18 can include, for example, temperature changes, acceleration, and static pressure. Additional effects such as drift in the electrical current through the laser 18, aging effects in the laser 18 and/or the cavity, and other factors can also modify the native frequency of the cavity of the optical cavity system 20. However, such effects are low-frequency effects, and can be substantially mitigated by the PLL 26, such that the PLL 26 can operate as a high-pass filter with respect to the microphone signal(s) ACSTC. Meanwhile, the acoustic input signal AIS can cause rapid changes in cavity length of the optical cavity system 20, as described herein, generating the frequency-modulation relative to the reference frequency signal F_REF to allow for robust, low-noise, and accurate detection of the acoustic input signal AIS.

Figure 2:
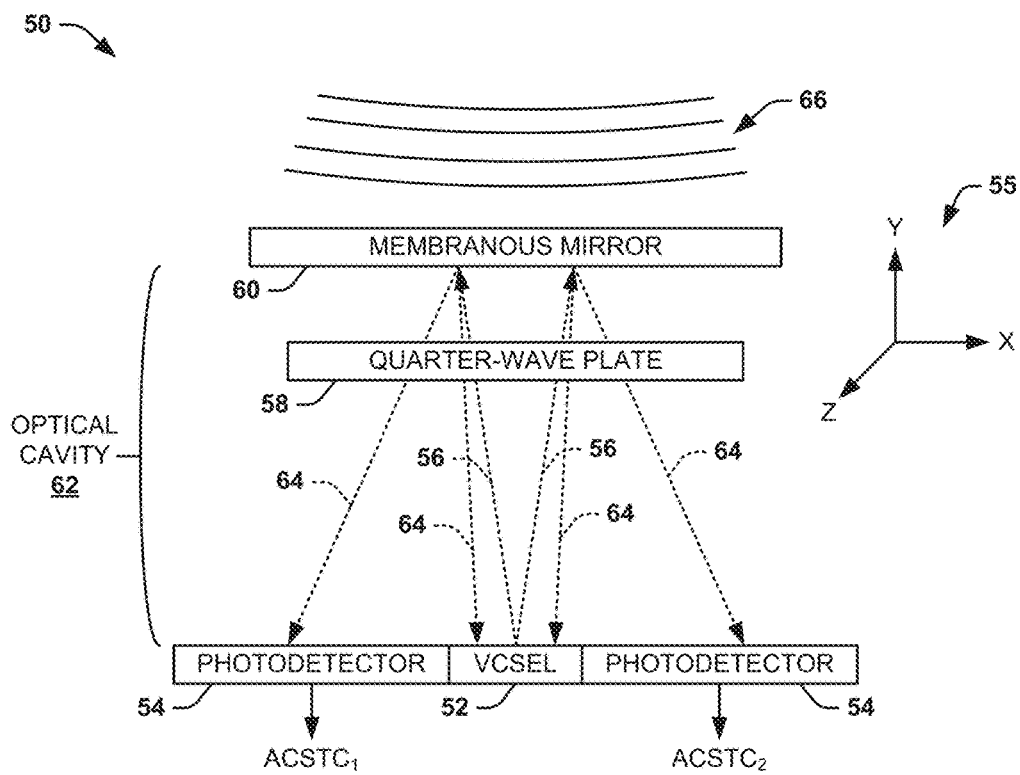
FIG. 2 illustrates an example of an optical acoustic detection system.

FIG. 2 illustrates an example of an optical acoustic detection system 50. The optical acoustic detection system 50 can correspond to the optical acoustic detection system 12 in the example of FIG. 1. Therefore, reference is to be made to the example of FIG. 1 in the following description of the example of FIG. 2.

The optical acoustic detection system 50 includes a VCSEL 52 that is arranged substantially coplanar with a plurality of photodetectors 54. As an example, the photodetectors 54 can be configured as photodiodes that substantially surround the VCSEL 52 in an approximate X-Z plane, as demonstrated by the Cartesian coordinate system 55. The VCSEL 52 is configured to emit an optical beam 56 from an aperture in approximately the direction of the Y-axis, with the optical beam 56 having a linear polarization (i.e., parallel or perpendicular). In the example of FIG. 2, the optical acoustic detection system 50 also includes a quarter-wave plate 58 in the optical path of the optical beam 56 emitted from the VCSEL 52. The quarter-wave plate 58 is therefore configured to provide a quarter-wave retardance to the optical beam 56 convert the optical beam 56 from the linear polarization to a circular polarization.

The optical acoustic detection system 50 also includes a membranous mirror 60, such as mounted to a housing of the optical microphone system 10 at an input. Therefore, the membranous mirror 60 can vibrate in response to an acoustic input signal AIS. The distance along the Y-axis between the VCSEL 52 and the membranous mirror 60 defines an optical cavity 62. Thus, the optical beam 56, having been converted to the circular polarization by the quarter-wave plate 58, reflects from the membranous mirror 60 back to the quarter-wave plate 58 as a reflected beam 64. The quarter-wave plate 58 thus converts the reflected beam 64 back to the linear polarization. However, based on the additional quarter-wave retardance provided by the quarter-wave plate 58, the linear polarization of the reflected beam 64 is orthogonal to the polarization of the optical beam 56 emitted from the VCSEL 52. Therefore, if the optical beam 56 has a perpendicular polarization, the reflected beam 58 has a parallel polarization, and if the optical beam 56 has a parallel polarization, the reflected beam 58 has a perpendicular polarization.

The reflected beam 64 is provided back to the VCSEL 52 and to the photodetectors 54. The photodetectors 54 are thus configured to monitor an intensity of the reflected beam 64. As described previously, the VCSEL 52 can have a gain medium that includes stimulation axes that are approximately orthogonal with respect to each other. Therefore, upon the reflected beam 64 being provided to the VCSEL 52, the reflected beam 64 begins to stimulate the stimulation axis that corresponds to the polarization of the reflected beam 64, and thus the stimulation axis that is orthogonal with respect to the optical beam 56 that is emitted from the VCSEL 52. As a result of the stimulation of the orthogonal stimulation axis, the VCSEL 52 switches the linear polarization of the optical beam 56 to correspond to the stimulation axis that is stimulated by the reflected beam 64. Therefore, the linear polarization of the reflected beam 64 changes to the orthogonal polarization with respect to the optical beam 56 based on the passing of both the optical beam 56 and the reflected beam 64 through the quarter-wave plate. Accordingly, the VCSEL 52 oscillates between the linear polarizations (e.g., perpendicular and parallel) in providing the optical beam 56.

Each of the photodetectors 54 is configured to generate a microphone signal ACSTC, demonstrated as microphone signals $ACSTC_1$ and $ACSTC_2$ in the example of FIG. 2, that correspond to the intensity of the reflected beam 64. At each transition of the optical beam 56 between the perpendicular and parallel linear polarizations, the optical beam 56, and thus the reflected beam 64, drops to an approximate zero intensity. Therefore, the microphone signals ACSTC can have a frequency corresponding to the transitions between the linear polarizations based on the intensity drop at each transition.

Figure 3:
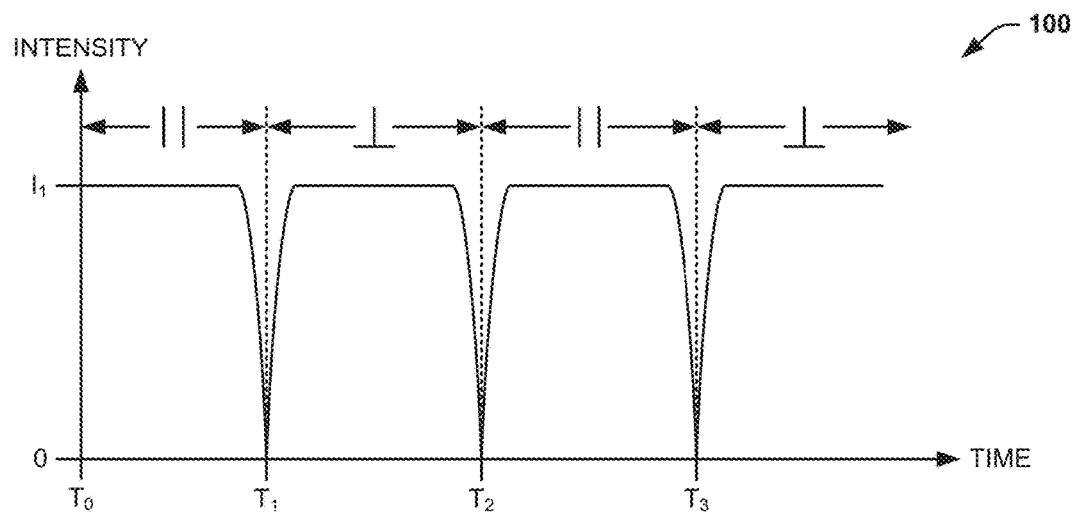
FIG. 3 illustrates an example of a timing diagram.

FIG. 3 illustrates an example of a timing diagram 100. The timing diagram 100 demonstrates an intensity profile of the reflected beam 64 over time, as measured by each of the photodetectors 54, and thus corresponding to the signals ACSTC. At a time $T_0$, the reflected beam 64 is provided to the photodetectors 54 at the parallel linear polarization at an intensity $I_1$, with the optical beam 56 being provided at the perpendicular polarization. Thus, during the time proceeding the time $T_0$, the reflected beam 64 stimulates the parallel stimulation axis of the gain medium of the VCSEL 52. As a result, at approximately a time $T_1$, the VCSEL 52 switches emission of the optical signal 56 from the perpendicular linear polarization to the parallel linear polarization. Therefore, the reflected beam 64 changes to the perpendicular linear polarization. At approximately the time $T_1$, the intensity of the reflected beam 64 drops to approximately zero as the VCSEL 52 switches emission of the optical beam 56 from the perpendicular linear polarization to the parallel linear polarization. Upon the emission of the optical beam 56 at the parallel linear polarization, the intensity of the reflected beam 64 increases back to approximately the intensity $I_1$.

At the time proceeding the time $T_1$, the reflected beam 64 stimulates the perpendicular stimulation axis of the gain medium of the VCSEL 52. As a result, at approximately a time $T_2$, the VCSEL 52 switches emission of the optical signal 56 from the parallel linear polarization to the perpendicular linear polarization. Therefore, the reflected beam 64 changes to the parallel linear polarization. At approximately the time $T_2$, the intensity of the reflected beam 64 drops to approximately zero as the VCSEL 52 switches emission of the optical beam 56 from the parallel linear polarization to the perpendicular linear polarization. Upon the emission of the optical beam 56 at the perpendicular linear polarization, the intensity of the reflected beam 64 increases back to approximately the intensity $I_1$.

The oscillation of the reflected beam between the linear polarizations continues thereafter. In the example of FIG. 3, the optical beam 56 switches from being emitted at the perpendicular linear polarization to the parallel linear polarization at approximately a time $T_3$. As a result, the reflected beam 64 switches from the parallel linear polarization to the perpendicular linear polarization at approximately the time $T_3$. Therefore, at approximately the time $T_3$, the intensity of the reflected beam 64 drops to approximately zero. Accordingly, the microphone signals ACSTC each have a frequency that is based on the oscillation of the reflected beam 64 between the linear polarizations. The optical microphone system 10 can therefore be calibrated such that a known stable frequency corresponds to a steady-state (i.e., absent an acoustic input signal AIS).

Referring back to the example of FIG. 2, as described previously, the membranous mirror 60 can vibrate in response to an acoustic input signal, demonstrated diagrammatically at 66 in the example of FIG. 2. In the example of FIG. 2, an acoustic input signal 66 results in a vibration of the membranous mirror 60 along the Y-axis. As a result, the length of the optical cavity 62 is modulated at the frequency of the acoustic input signal 66, such that the time that the optical beam 56 and the reflected beam 64 respectively traverse the optical cavity 62 is likewise modulated at the frequency of the acoustic input signal 66. Accordingly, the frequency of the oscillations between the linear polarizations of the reflected beam 64, and thus the frequency of the microphone signals ACSTC, is modulated at the frequency of the acoustic input signal 66. Accordingly, the change in frequency of the microphone signals ACSTC can directly correspond to the characteristics (e.g., frequency and amplitude) of the acoustic input signal 66.

In addition, because the microphone signals $ACSTC_1$ and $ACSTC_2$ are independently generated by the respective photodetectors 54, the microphone signals $ACSTC_1$ and $ACSTC_2$ can indicate the characteristics of the acoustic input signal 66 even in the presence of uneven vibration of the membranous mirror 60 across at least one of the X- and Z-axes. As a result, the reflected beam 64 can be provided to a greater surface area of the photodetector 54 that generates the microphone signal $ACSTC_1$ than the photodetector 54 that generates the microphone signal $ACSTC_2$, or vice-versa. The use of the multiple photodetectors 54 can thus provide for a more robust optical microphone system 10, such that the vector components of the acoustic input signal 66 do not have a deleterious impact on the operation of the optical microphone system 10. While the example of FIG. 2 demonstrates two photodetectors 54, it is to be understood that the optical acoustic detection system 50 could instead include a single photodetector 54, or more than two photodetectors 54. Therefore, the optical acoustic detection system 50 can be configured in any of a variety of ways.

Figure 4:
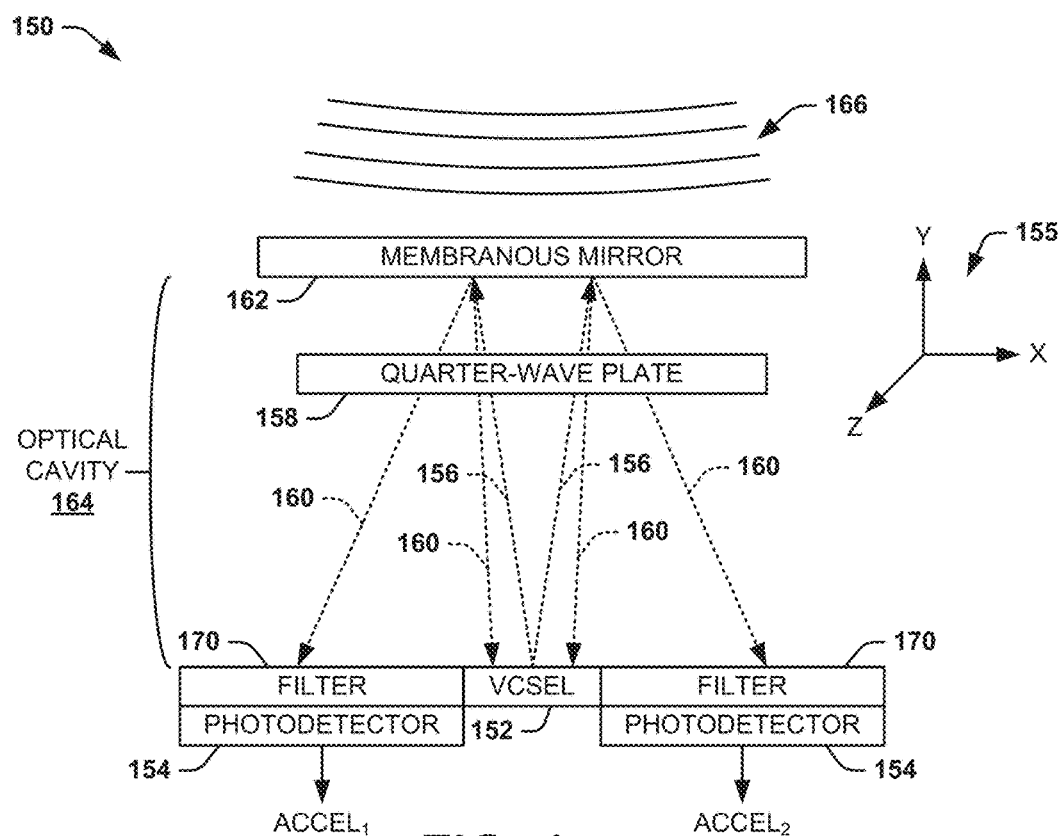
FIG. 4 illustrates another example of an optical acoustic detection system.

FIG. 4 illustrates another example of an optical acoustic detection system 150. The optical acoustic detection system 150 can correspond to the optical acoustic detection system 12 in the example of FIG. 1. Therefore, reference is to be made to the example of FIG. 1 in the following description of the example of FIG. 4.

The optical acoustic detection system 150 is configured substantially similar to the optical acoustic detection system 50 in the example of FIG. 2. In the example of FIG. 4, the optical acoustic detection system 150 includes a VCSEL 152 that is arranged substantially coplanar with a plurality of photodetectors 154. The VCSEL 152 is configured to emit an optical beam 156 from an aperture in approximately the direction of the Y-axis according to a Cartesian coordinate system 155, with the optical beam 156 oscillating between linear polarizations, in the manner described previously in the example of FIG. 2. Specifically, the optical acoustic detection system 150 includes a quarter-wave plate 158 that converts the linear polarization of the optical beam 156 to the orthogonal linear polarization in a reflected beam 160. The optical acoustic detection system 150 further includes a membranous mirror 162 that is mounted to a housing of the optical microphone system 10, with the distance along the Y-axis between the VCSEL 152 and the membranous mirror 162 defining an optical cavity 164. Thus, the membranous mirror 162 can vibrate in response to an acoustic input signal, demonstrated diagrammatically at 166 in the example of FIG. 4.

In addition, the optical acoustic detection system 150 includes polarization filters 168 overlaying the photodetectors 154. As an example, the polarization filters 168 can be configured to filter a specific linear polarization, such that the photodetectors 154 can be prevented from receiving the reflected beam 160 when the reflected beam 160 is being provided at that specific linear polarization. Therefore, the microphone signals ACSTC can have a magnitude of approximately zero during the time when the reflected beam 160 is being provided at that specific linear polarization.

Figure 5:
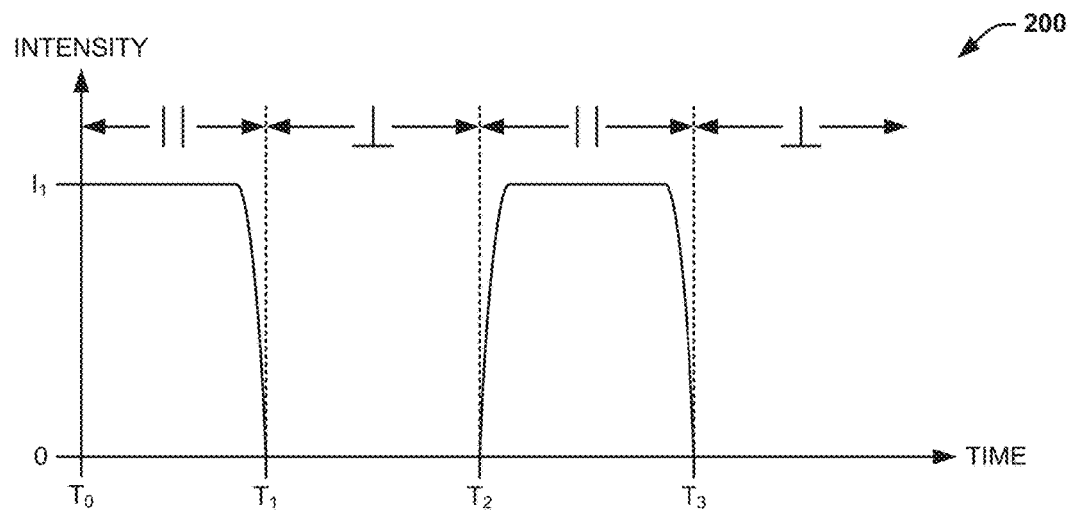
FIG. 5 illustrates another example of a timing diagram.

FIG. 5 illustrates another example of a timing diagram 200. The timing diagram 200 demonstrates an intensity profile of the reflected beam 160 over time, as measured by each of the photodetectors 154, and thus corresponding to the signals ACSTC. As an example, the polarization filters 168 can be configured to filter the perpendicular linear polarization. At a time $T_0$, the reflected beam 160 is provided to the photodetectors 154 at the parallel linear polarization at an intensity $I_1$, with the optical beam 156 being provided at the perpendicular polarization. Thus, during the time proceeding the time $T_0$, the reflected beam 160 stimulates the parallel stimulation axis of the gain medium of the VCSEL 152. As a result, at approximately a time $T_1$, the VCSEL 152 switches emission of the optical signal 156 from the perpendicular linear polarization to the parallel linear polarization. Therefore, the reflected beam 160 changes to the perpendicular linear polarization. At approximately the time $T_1$, the intensity of the reflected beam 160 drops to approximately zero as the VCSEL 152 switches emission of the optical beam 156 from the perpendicular linear polarization to the parallel linear polarization. However, because of the polarization filters 168 filtering the perpendicular linear polarization of the reflected beam 160, the intensity of the reflected beam 160 as measured by the photodetectors 154 remains at approximately zero.

At the time proceeding the time $T_1$, the reflected beam 160 stimulates the perpendicular stimulation axis of the gain medium of the VCSEL 152. As a result, at approximately a time $T_2$, the VCSEL 152 switches emission of the optical signal 156 from the parallel linear polarization to the perpendicular linear polarization. Therefore, the reflected beam 160 changes to the parallel linear polarization. Upon the emission of the optical beam 156 at the perpendicular linear polarization, and thus the reflected beam 160 being provided at the parallel linear polarization, the intensity of the reflected beam 160 as measured by the photodetectors 154 increases back to approximately the intensity $I_1$.

The oscillation of the reflected beam between the linear polarizations continues thereafter. In the example of FIG. 5, the optical beam 156 switches from being emitted at the perpendicular linear polarization to the parallel linear polarization at approximately a time $T_3$. As a result, the reflected beam 160 switches from the parallel linear polarization to the perpendicular linear polarization at approximately the time $T_3$. Therefore, at approximately the time $T_3$, the intensity of the reflected beam 160 drops to approximately zero as measured by the photodetectors 154 and remains at approximately zero until the optical beam 156 is again provided with the perpendicular linear polarization. Accordingly, similar to as described previously, the microphone signals ACSTC each have a frequency that is based on the oscillation of the reflected beam 160 between the linear polarizations. However, in the example of FIGS. 4 and 5, the frequency of the microphone signals ACSTC can be more easily measured based on the change in intensity between zero and the intensity $I_1$ through every other linear polarization change.

Figure 6:
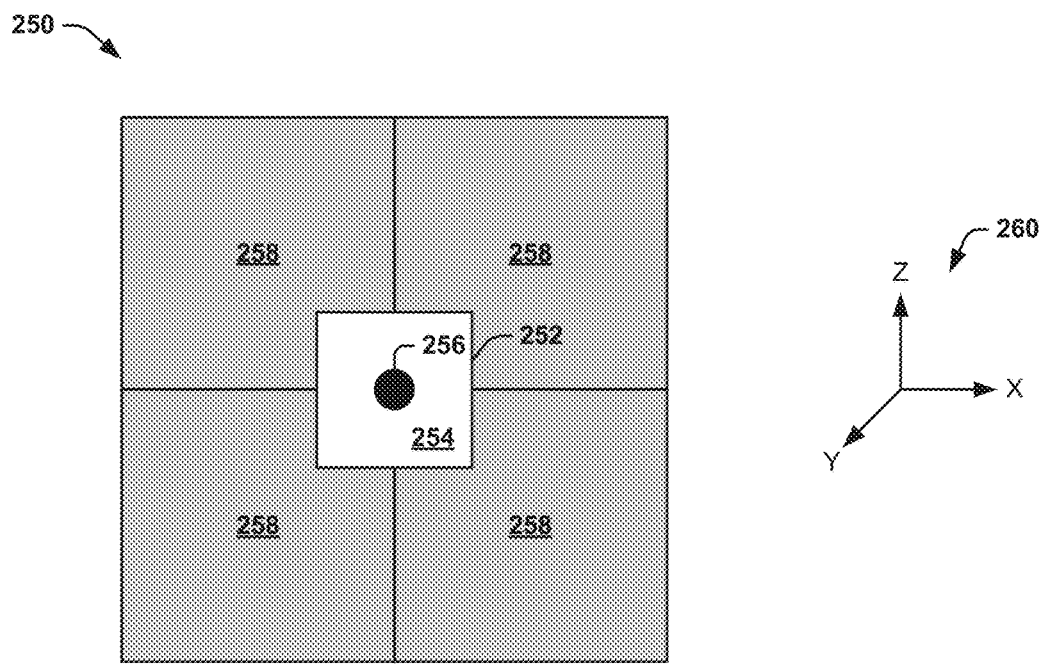
FIG. 6 illustrates an example of a top-view of an optical acoustic detection system.

FIG. 6 illustrates an example of a top-view of an optical acoustic detection system 250. The optical acoustic detection system 250 can correspond to the optical acoustic detection system 50 in the example of FIG. 2 or the optical acoustic detection system 150 in the example of FIG. 4. The optical acoustic detection system 250 includes a VCSEL 252 that includes a substrate 254 and a gain medium with aperture 256. The optical acoustic detection system 250 also includes a plurality of photodetectors 258 that substantially surround the VCSEL 252 in an X-Z plane, as demonstrated based on a Cartesian coordinate system 260.

In the example of FIG. 6, the VCSEL 252 is configured to emit an optical beam in the +Y direction from the aperture 256. The optical beam can thus be reflected back via a membranous mirror to be received as a reflected beam having an orthogonal polarization by the gain medium 256 and the photodetectors 258. Therefore, based on the orthogonal polarization of the reflected beam received at the gain medium 256, the optical beam can oscillate between the orthogonal linear polarizations, as described previously. In addition, the photodetectors 258 can each be configured to separately generate microphone signals having a frequency that corresponds to acoustic input signal AIS.

In addition, because the photodetectors 258 each generate microphone signals independently, the microphone signals can indicate the magnitude of the acoustic input signal AIS even in the presence of a vector component of the reflected optical beam in at least one of the X- and Z-axes, such as based on a non-uniformity of the membranous mirror. As an example, the reflected beam can be provided to a greater surface one or more of the photodetectors 258 in the example of FIG. 6 relative to others of the photodetectors 258. Therefore, the optical microphone system in which the optical acoustic detection system 250 is included can be operated in a robust manner, such that the vector components of the acoustic input signal AIS do not have a deleterious impact on the operation of the associated optical microphone system.

Figure 7:
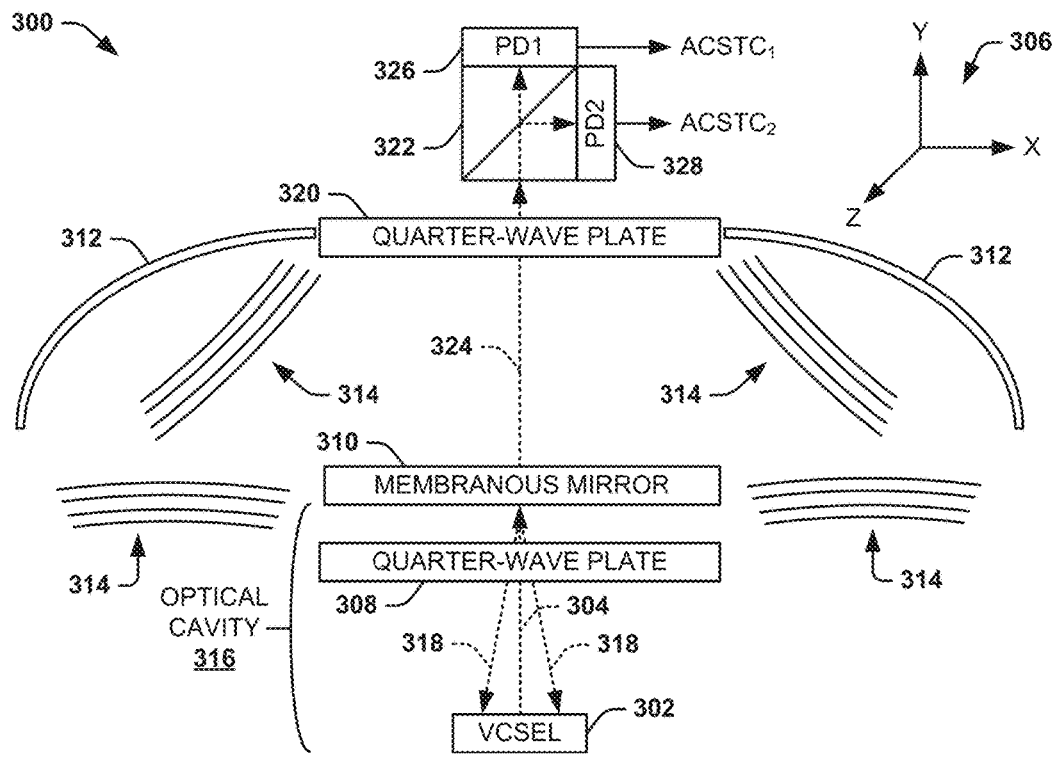
FIG. 7 illustrates yet another example of an optical acoustic detection system.

FIG. 7 illustrates yet another example of an optical acoustic detection system 300. The optical acoustic detection system 300 can correspond to the optical acoustic detection system 12 in the example of FIG. 1. Therefore, reference is to be made to the example of FIG. 1 in the following description of the example of FIG. 7.

The optical acoustic detection system 300 includes a VCSEL 302 that is configured to emit an optical beam 304 from an aperture in approximately the direction of the Y-axis, as demonstrated by the Cartesian coordinate system 306, with the optical beam 304 having a linear polarization (i.e., parallel or perpendicular). In the example of FIG. 7, the optical acoustic detection system 300 also includes a first quarter-wave plate 308 in the optical path of the optical beam 304 to convert the optical beam 304 from the linear polarization to a circular polarization.

The optical acoustic detection system 300 also includes a membranous mirror 310 and an acoustic reflector 312, such as mounted to a housing of the optical microphone system 10 at an input. The acoustic reflector 312 can be arranged as a substantially concave structure that substantially surrounds a portion of the optical acoustic detection system 300, and is thus demonstrated in the example of FIG. 7 in a cross-section. The acoustic reflector 312 can thus reflect the acoustic input signal, demonstrated at 314, toward the membranous mirror 310. Therefore, the membranous mirror 310 can vibrate in response to the acoustic input signal 314. The distance along the Y-axis between the VCSEL 302 and the membranous mirror 310 defines an optical cavity 316. In the example of FIG. 7, the membranous mirror 310 is configured as a partially-reflective (e.g., 70%-90% reflective) mirror to be reflective of a first portion of the optical beam 304 and to be transmissive of a second portion of the optical beam 304. Thus, the first portion of the transmitted optical beam 304, having been converted to the circular polarization by the first quarter-wave plate 308, reflects from the membranous mirror 310 back to the first quarter-wave plate 308 as a reflected beam 318. The first quarter-wave plate 308 thus converts the reflected beam 318 back to the linear polarization that is orthogonal to the linear polarization of the optical beam 308, such that the VCSEL 302 oscillates between the linear polarizations (e.g., perpendicular and parallel) in providing the optical beam 304, as described previously regarding the example of FIG. 2.

The optical acoustic detection system 300 also includes a second quarter-wave plate 320 and a polarizing beamsplitter 322. The second quarter-wave plate 320 is located opposite the membranous mirror 310 from the VCSEL 302. As described previously, the membranous mirror 310 is partially-silvered, such that the second portion of the transmitted optical beam 304, having been converted to the circular polarization by the first quarter-wave plate 308, is transmitted through the membranous mirror 310 to the second quarter-wave plate 320 as a transmissive beam 324. The second quarter-wave plate 320 can thus convert the optical beam 304 from the circular polarization back to the linear polarization that is orthogonal to the linear polarization of the optical beam 308, such that the transmissive beam 324 oscillates between the first linear polarization and the second linear polarization. The polarizing beamsplitter 322 is configured to be transmissive with respect to the first linear polarization of the transmissive beam 324 and to be reflective with respect to the second linear polarization of the transmissive beam 324. Thus, the first linear polarization of the transmissive beam 324 is provided to a first photodetector 326 and the second linear polarization of the transmissive beam 324 is provided to a second photodetector 328.

Each of the photodetectors 326 and 328 is configured to generate a microphone signal ACSTC, demonstrated as microphone signals $ACST_{C1}$ and $ACST_{C2}$ in the example of FIG. 7, that correspond to the intensity of the respective first linear polarization of the transmissive beam 324 and second linear polarization of the transmissive beam 324. At each transition of the optical beam 304 between the perpendicular and parallel linear polarizations, the intensity of a respective one of the first linear polarization of the transmissive beam 324 and second linear polarization of the transmissive beam 324 drops to an approximate zero intensity. Therefore, the microphone signals $ACST_{C1}$ and $ACST_{C2}$ can have a frequency corresponding to the transitions between the linear polarizations based on the intensity change at each transition. As an example, the acoustic processor 16 can be configured to subtract one of the microphone signals $ACST_{C1}$ and $ACST_{C2}$ from the other of the microphone signals $ACST_{C1}$ and $ACST_{C2}$ to calculate a mathematical difference between the microphone signals $ACST_{C1}$ and $ACST_{C2}$.

Figure 8:
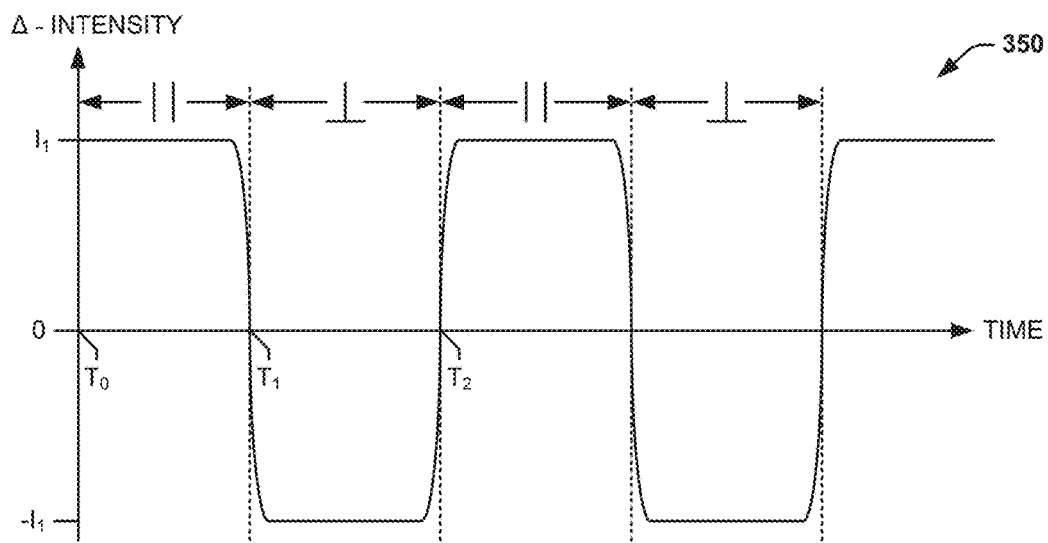
FIG. 8 illustrates yet another example of a timing diagram.

FIG. 8 illustrates an example of a timing diagram 350. The timing diagram 350 demonstrates an intensity profile of the transmissive beam 324 over time, as measured by each of the photodetectors 326 and 328, and thus corresponding to the microphone signals $ACST_{C1}$ and $ACST_{C2}$. At a time $T_0$, the transmissive beam 324 is provided to the polarizing beamsplitter 322 at the parallel linear polarization at an intensity $I_1$, and thus with a perpendicular polarization being intensity zero. Therefore, the polarizing beamsplitter 322 is transmissive of the transmissive beam 324 to provide the transmissive beam 324 to the first photodetector 326. Thus, during the time proceeding the time $T_0$, the reflected beam 318 stimulates the parallel stimulation axis of the gain medium of the VCSEL 302. The acoustic processor 16 can monitor the intensity of the parallel polarization intensity of the transmissive beam 324 by subtracting the second microphone signal $ACST_{C2}$ from the first microphone signal $ACST_{C1}$ (intensity $I_1-0=I_1$).

At approximately a time $T_1$, the VCSEL 302 switches emission of the optical signal 306 from the perpendicular linear polarization to the parallel linear polarization. Therefore, the transmissive beam 324 is provided to the polarizing beamsplitter 322 at the perpendicular linear polarization at an intensity $I_1$, and thus with a parallel polarization being intensity zero. Therefore, the polarizing beamsplitter 322 is reflective of the transmissive beam 324 to provide the transmissive beam 324 to the second photodetector 328. Thus, during the time proceeding the time $T_1$, the reflected beam 318 stimulates the perpendicular stimulation axis of the gain medium of the VCSEL 302. The acoustic processor 16 can monitor the intensity of the perpendicular polarization intensity of the transmissive beam 324 by subtracting the second microphone signal $ACST_{C2}$ from the first microphone signal $ACST_{C1}$ (intensity $0-I_1=-I_1$).

The oscillation of the reflected beam between the linear polarizations continues thereafter. In the example of FIG. 8, the optical beam 304 switches from being emitted at the parallel linear polarization to the perpendicular linear polarization at approximately a time $T_2$. As a result, the transmissive beam 324 switches from the perpendicular linear polarization to the parallel linear polarization at approximately the time $T_2$. Therefore, at approximately the time $T_2$, the mathematical difference of the first and second linear polarization components of the transmissive beam 324 increases from $-I_1$ to $I_1$. Accordingly, mathematical difference of the microphone signals $ACST_{C1}$ and $ACST_{C2}$ has a frequency that is based on the oscillation of the transmissive beam 324 between the linear polarizations. The optical microphone system 10 can therefore be calibrated such that a known stable frequency corresponds to a steady-state (i.e., absent an acoustic input signal AIS).

Based on the calculation of the mathematical difference of the microphone signals $ACST_{C1}$ and $ACST_{C2}$ to determine the characteristics of the acoustic input signal AIS, and thus based on implementing differential detection techniques based on the pair of photodetectors 326 and 324, common mode noise sources such as background/stray light that may contribute to frequency/phase noise in the microphone signals $ACST_{C1}$ and $ACST_{C2}$ can be substantially suppressed. In addition, the differential detection of the transmissive beam 324 allows collection and use of substantially all of the available detection light of the transmissive beam 324, while maintaining the optical detection advantages of the polarization-sensitive detection scheme demonstrated by the optical acoustic detection system 150 in the example of FIG. 4. However, the fundamental noise limit due to photon shot noise can be substantially reduced by a factor of approximately the square root of two based on collecting approximately twice as much optical energy as the optical acoustic detection system 150 in the example of FIG. 4.

Similar to as described previously, the optical acoustic detection system 300 is not intended to be limited to the example of FIG. 7. As an example, the acoustic reflector 312 is configured to increase the available acoustic power, thus increasing the amount of the acoustic signal 314 that is incident on the membranous mirror 310 to correspondingly increase the potential sensitivity of the optical acoustic detection system 300 (e.g. to decrease the minimum acoustic signal 314 required for detection). However, the acoustic reflector 312 is not required for operation of the optical acoustic detection system 300. On the contrary, while the acoustic reflector 312 is not demonstrated as being part of the optical acoustic detection systems 50 and 150 in the respective examples of FIGS. 2 and 4, it is to be understood that the acoustic reflector 312 could be implemented in the optical acoustic detection systems 50 and 150 in the respective examples of FIGS. 2 and 4 to reflect the acoustic signal AIS toward the respective membranous mirrors 60 and 162. Additionally, a given optical acoustic detection system described herein can include photodetectors coupled to a polarizing beamsplitter, such as demonstrated in the example of FIG. 7, as well as including photodetector(s) substantially coplanar with the VCSEL, such as demonstrated in the examples of FIGS. 2 and 4, such that the photodetectors can operate in concert to provide corresponding microphone signals. Accordingly, the optical acoustic detection systems described herein can be configured in a variety of ways.

Figure 9:
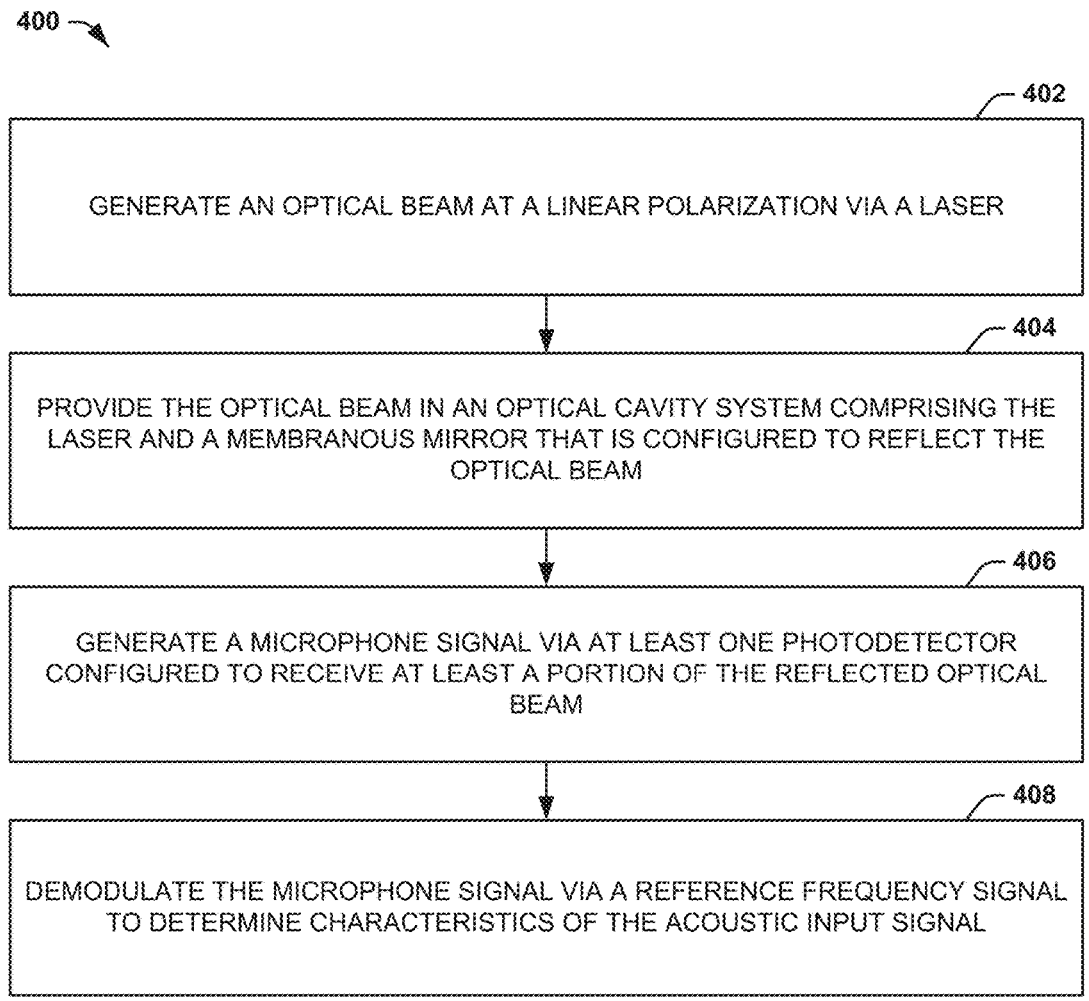
FIG. 9 illustrates an example of a method for determining characteristics of an acoustic input signal.

In view of the foregoing structural and functional features described above, a methodology in accordance with various aspects of the present invention will be better appreciated with reference to FIG. 9. While, for purposes of simplicity of explanation, the methodology of FIG. 9 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 9 illustrates an example of a method 400 for determining characteristics of an acoustic input signal (e.g., the acoustic input signal AIS). At 402, an optical beam (e.g., the optical beam 56) is generated at a linear polarization via a laser (e.g., the laser 18). At 404, the optical beam is provided in an optical cavity system (e.g., the optical cavity system 20) comprising the laser and a membranous mirror (e.g., the membranous mirror 22) that is configured to reflect the optical beam. At 406, a microphone signal (e.g., the microphone signal(s) ACSTC) is generated via at least one photodetector (e.g., the photodetector(s) 24) configured to receive at least a portion of the reflected optical beam (e.g., the reflected beams 64). The microphone signal can be indicative of vibration of the membranous mirror resulting from the acoustic input signal. At 408, the microphone signal is demodulated via a reference frequency signal (e.g., the reference signal F_REF) to determine characteristics (e.g., frequency and amplitude) of the acoustic input signal.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. An optical microphone system comprising:
    a laser configured to emit an optical beam at a linear polarization;
    an optical cavity system comprising a membranous mirror that is configured to reflect the optical beam and to vibrate in response to an acoustic input signal;
    at least one photodetector configured to receive at least a portion of the optical beam to generate a microphone signal that is indicative of the vibration of the membranous mirror resulting from the acoustic input signal based on the reflection of the optical beam, wherein the microphone signal is a frequency-modulated (FM) signal comprising a carrier signal that is associated with the linear polarization of the optical beam and a baseband signal corresponding to the acoustic input signal; and
    an acoustic processor configured to demodulate the microphone signal via a reference frequency signal associated with the carrier signal to determine at least one of an amplitude and a frequency of the acoustic input signal.

2. The system of claim 1, wherein the optical cavity system further comprises a quarter-wave plate arranged between the laser and the membranous mirror and configured to convert the optical beam from a first linear polarization to a circular-polarization and to convert the reflected optical beam from the circular-polarization to a second linear polarization.

3. The system of claim 2, wherein the laser is configured as a vertical-cavity surface-emitting laser (VCSEL) that is configured to oscillate between emitting the optical beam at the first linear polarization and emitting the optical beam at the second linear polarization in response to the VCSEL receiving the reflected optical signal.

4. The system of claim 3, wherein the optical cavity system further comprises at least one polarization filter overlaying the respective at least one photodetector and being configured to substantially filter one of the first and second linear polarizations from the respective at least one photodetector.

5. The system of claim 3, wherein the microphone signal comprises periodic transitions corresponding to oscillation between the first and second linear polarizations of the reflected optical beam, and wherein the acoustic processor is configured to determine the characteristics of the acoustic input signal based on a frequency of the periodic transitions of the microphone signal.

6. The system of claim 5, further comprising a local oscillator configured to generate the reference frequency signal that is phase-locked to a frequency associated with a native frequency corresponding to the periodic transitions between the first and second linear polarizations of the reflected optical beam, wherein the acoustic processor is configured to demodulate the microphone signal by the reference frequency signal to determine the characteristics of the acoustic input signal.

7. The system of claim 1, further comprising a local oscillator configured to generate the reference frequency signal that is phase-locked to a frequency associated with periodic linear polarization transitions of the optical beam, wherein the acoustic processor is configured to demodulate the microphone signal by the reference frequency signal to determine the at least one of the amplitude and the frequency of the acoustic input signal.

8. The system of claim 7, wherein the acoustic processor comprises a phase-lock loop configured to phase-lock the reference frequency signal to the frequency associated with periodic linear polarization transitions of the optical beam at an update frequency that is less than a minimum audible detection frequency of the acoustic input signal.

9. The system of claim 1, wherein the at least one photodetector comprises a plurality of photodetectors that substantially surround and are substantially planar with a gain medium associated with the laser, the plurality of photodetectors being configured to generate a respective plurality of microphone signals, wherein the acoustic processor is configured to determine the at least one of the amplitude and the frequency of the acoustic input signal based on the plurality of microphone signals.

10. The system of claim 1, further comprising an acoustic reflector configured to reflect the acoustic input signal toward the membranous mirror.

11. The system of claim 1, wherein the membranous mirror is partially silvered, such that the membranous mirror is configured to reflect a first portion of the optical beam and to pass a second portion of the optical beam, the system further comprising a polarizing beamsplitter configured to separate the second portion of the optical beam into a first linear polarization and a second linear polarization that is orthogonal with respect to the first linear polarization, wherein the at least one photodetector is configured to monitor an intensity of the second portion of the optical beam with respect to the respective at least one of the first and second linear polarizations to generate the microphone signal having a frequency that corresponds to an oscillation of the second portion of the optical beam between the first and second linear polarizations, wherein the acoustic processor is configured to determine the at least one of the amplitude and the frequency of the acoustic input signal based on the frequency of the microphone signal.

12. The system of claim 11, wherein the at least one photodetector comprises:
    a first photodetector configured to monitor an intensity of the second portion of the optical beam with respect to the first linear polarization to generate a first microphone signal; and
    a second photodetector configured to monitor an intensity of the second portion of the optical beam with respect to the second linear polarization to generate a second microphone signal, wherein the acoustic processor is configured to determine the at least one of the amplitude and the frequency of the acoustic input signal based on the frequency of a mathematical difference between the first microphone signal and the second microphone signal.

13. A method for determining characteristics of an acoustic input signal, the method comprising:
generating an optical beam at a linear polarization via a laser;
providing the optical beam in an optical cavity system comprising the laser and a membranous mirror that is configured to reflect the optical beam;
generating a microphone signal via at least one photodetector configured to receive at least a portion of the optical beam, the microphone signal being indicative of vibration of the membranous mirror resulting from the acoustic input signal based on the reflection of the optical beam, wherein the microphone signal is a frequency-modulated (FM) signal comprising a carrier signal that is associated with the linear polarization of the optical beam and a baseband signal corresponding to the acoustic input signal; and
demodulating the microphone signal via a reference frequency signal associated with the carrier signal to determine at least one of an amplitude and a frequency of the acoustic input signal.

14. The method of claim 13, wherein generating the optical beam comprises periodically switching the linear polarization of the optical beam between a first linear polarization and a second linear polarization, and wherein generating the microphone signal comprises generating the microphone signal such that the frequency of the microphone signal is based on a frequency of the periodic switching of the linear polarization of the optical beam between the first linear polarization and the second linear polarization and based on the vibration of the membranous mirror resulting from the acoustic input signal.

15. The method of claim 14, further comprising generating the reference frequency signal via a local oscillator, the reference frequency signal having a frequency associated with a native frequency corresponding to the periodic switching between the first and second linear polarizations of the optical beam, wherein demodulating the microphone signal comprises demodulating the microphone signal via the reference frequency signal to remove the carrier signal associated with the periodic switching between the first and second linear polarizations of the optical beam from the microphone signal.

16. The method of claim 13, further comprising phase-locking the reference frequency signal to a frequency associated with periodic linear polarization transitions of the optical beam at an update frequency that is less than a minimum audible detection frequency of the acoustic input signal.

17. An optical microphone system comprising:
a local oscillator configured to generate a reference frequency signal;
an optical acoustic detection system comprising:
a laser configured to emit an optical beam at a linear polarization that periodically transitions between a first linear polarization and a second linear polarization in response to a reflected portion of the optical beam; and
an optical cavity system comprising:
a quarter-wave plate arranged between the laser and the membranous mirror and configured to convert the optical beam from one of the first and second linear polarizations to a circular-polarization and to convert the reflected optical beam from the circular-polarization to the other of the first and second linear polarizations;
a membranous mirror that is configured to reflect the optical beam to provide the reflected optical beam; and
at least one photodetector configured to receive at least a portion of the optical beam to generate a microphone signal that is indicative of vibration of the membranous mirror resulting from an acoustic input signal based on the reflected optical beam, wherein the microphone signal is a frequency-modulated (FM) signal comprising a carrier signal that is associated with the linear polarization of the optical beam and a baseband signal corresponding to the acoustic input signal; and
an acoustic processor configured to demodulate the microphone signal via the reference frequency signal associated with the carrier signal to determine at least one of a frequency and an amplitude of the acoustic input signal based on the microphone signal relative to the reference frequency signal.

18. The system of claim 17, wherein the carrier signal is associated with the periodic transitions between the first linear polarization and the second linear polarization and a baseband signal corresponding to the acoustic input signal, wherein the acoustic processor is configured to demodulate the microphone signal via the reference frequency signal to determine the at least one of the amplitude and the frequency of the acoustic input signal.

19. The system of claim 17, wherein the acoustic processor is configured to phase-lock the reference frequency signal to a frequency associated with a native frequency corresponding to the periodic transitions between the first and second linear polarizations of the reflected optical beam at an update frequency that is less than a minimum audible detection frequency of the acoustic input signal, wherein the acoustic processor is configured to demodulate the microphone signal by the reference frequency signal to determine the at least one of the frequency and the amplitude of the acoustic input signal.

* * * * *